United States Patent [19]

Wilhelm

[11] Patent Number: 4,935,641

[45] Date of Patent: Jun. 19, 1990

[54] ELECTRONIC RHEOSTAT METHOD AND APPARATUS

[75] Inventor: Daniel D. Wilhelm, Reed City, Mich.

[73] Assignee: Nartron Corporation, Reed City, Mich.

[21] Appl. No.: 227,151

[22] Filed: Aug. 2, 1988

[51] Int. Cl.⁵ .............................................. H02J 1/00
[52] U.S. Cl. ................................... 307/10.8; 307/10.1
[58] Field of Search ................. 307/9, 10 R, 9.1, 10.1, 307/10.8; 323/282, 283, 284, 288, 326, 280, 281, 300; 361/18, 78, 86, 88, 91

[56] References Cited

U.S. PATENT DOCUMENTS

| | | | |
|---|---|---|---|
| 4,093,908 | 6/1978 | Evans | 323/300 |
| 4,160,945 | 7/1979 | Schorr | 323/288 |
| 4,311,956 | 1/1982 | Tolmie, Jr. | 323/326 X |
| 4,636,711 | 1/1987 | Freymuth | 323/282 |

OTHER PUBLICATIONS

Wagstaff, "Dual Purpose Lights Reminder for Cars Reminds You to Turn Your Lights On Reminds You to Turn Your Lights Off," *Practical Electronics*, vol. 15, No. 3 (Mar. 1979), pp. 62-64.

*Primary Examiner*—Vit W. Miska
*Assistant Examiner*—Sharon D. Logan
*Attorney, Agent, or Firm*—Watts, Hoffmann, Fisher & Heinke

[57] ABSTRACT

An electronic reostat circuit having a pulse width modulated output for controlling energization of a device such as a vehicle dashboard illumination lamp. A comparator circuit compares a reference signal adjusted by a user with an alternating signal, preferably a saw tooth waveform, and generates a pulse width modulated output whose duty cycle varies directly with the size of the reference signal. The reference signal is generated by a tapped resistor array wherein contacts on the array are coupled to ground by a rotary switch contact which can be adjusted by the user. By raising and lowering the reference signal, the duty cycle can be changed from a minimum to maximum and thereby produce a minimum and maximum lamp illumination signal.

15 Claims, 3 Drawing Sheets

ELECTRONIC RHEOSTAT METHOD AND APPARATUS

TECHNICAL FIELD

The present invention concerns a control circuit for energizing a device with a pulse width modulated signal whose duty cycle is controlled to vary the power delivered to the device by the control circuit.

BACKGROUND ART

A conventional technique for controlling the intensity of an instrument cluster on a motor vehicle dashboard incorporates a mechanical rheostat in series with a voltage supply. The series resistance of the rheostat attenuates power delivered to the panel lamps and allows the automobile operator to adjust the light intensity from the dash panel. The use of a series limiting resistance in a rheostat dissipates unnecessary amounts of heat which is not only inefficient, but can alter the operating characteristics of other instrument panel components. In addition, the rheostat power adjustment technique of the prior art results in variable operation between different electronic subassemblies.

DISCLOSURE OF THE INVENTION

The present invention concerns a solid state device driver, particularly adapted for use in energizing one or more dashboard panel lamps in a motor vehicle.

A control circuit for regulating operation of a dashboard panel lamp is powered by a voltage source which in addition to energizing the control circuit, is used to activate the panel lamp. In a motor vehicle use of the invention, this power source would be the battery which is switched to the circuit through the ignition input.

An oscillator is included in the control circuit for generating an oscillating waveform that varies between a maximum and a minimum voltage. A comparator monitors this oscillating signal and compares the oscillating signal with a user-adjusted reference voltage to produce a pulse width modulated output having a duty cycle (or on/off period) that varies with the user-adjusted reference voltage. The output from the comparator is coupled to a drive circuit that accepts the pulse width modulated signal from the comparator and energizes the panel lamps in synchronism with this output. The reference voltage signal to the comparator circuit is generated by a voltage divider circuit having a switch which allows the user to adjust the reference voltage and thereby control the average power delivered to the panel lamps.

In accordance with a preferred embodiment of the invention, the adjustable reference input to the comparator circuit is derived from a voltage divider having a fixed leg and a variable leg coupled through a rotary switch which selectively taps into a voltage divider network to adjust the reference level input to the comparator. Thus, although an adjustable resistance is utilized in accordance with a preferred design, this resistance does not directly dim the panel lamps, but instead is used to generate a reference signal. The resistance values can be substantially greater than those used for series signal attenuation in the prior art. This results in less current flow and thus less heat dissipation.

Since one object of the invention is to reduce heat dissipation, the signal driver coupled to the panel lamps has a low impedance. To accomplish this goal, the preferred embodiment utilizes an FET having its drain contact coupled to the battery voltage through the vehicle ignition. Since the FET conducts when the gate voltage exceeds the source voltage by a specified amount, the preferred circuit includes a voltage doubler that generates a voltage greater than the ignition signal to bias the FET into conduction.

A circuit constructed in accordance with the invention also provides a low power analog output coupled to the user adjustable voltage divider. This analog output provides compatibility with existing systems that require an analog power adjustment.

From the above it is appreciated that one object of the invention is a solid state control circuit for adjusting the power delivered by an energizing signal. One use of the invention is for controlling the panel lamp intensity in a motor vehicle dashboard. This and other objects, advantages and features of the invention will become better understood from a detailed description of the invention when discussed in conjunction with the accompanying drawings.

BEST MODE FOR CARRYING OUT THE INVENTION

Figure 1:
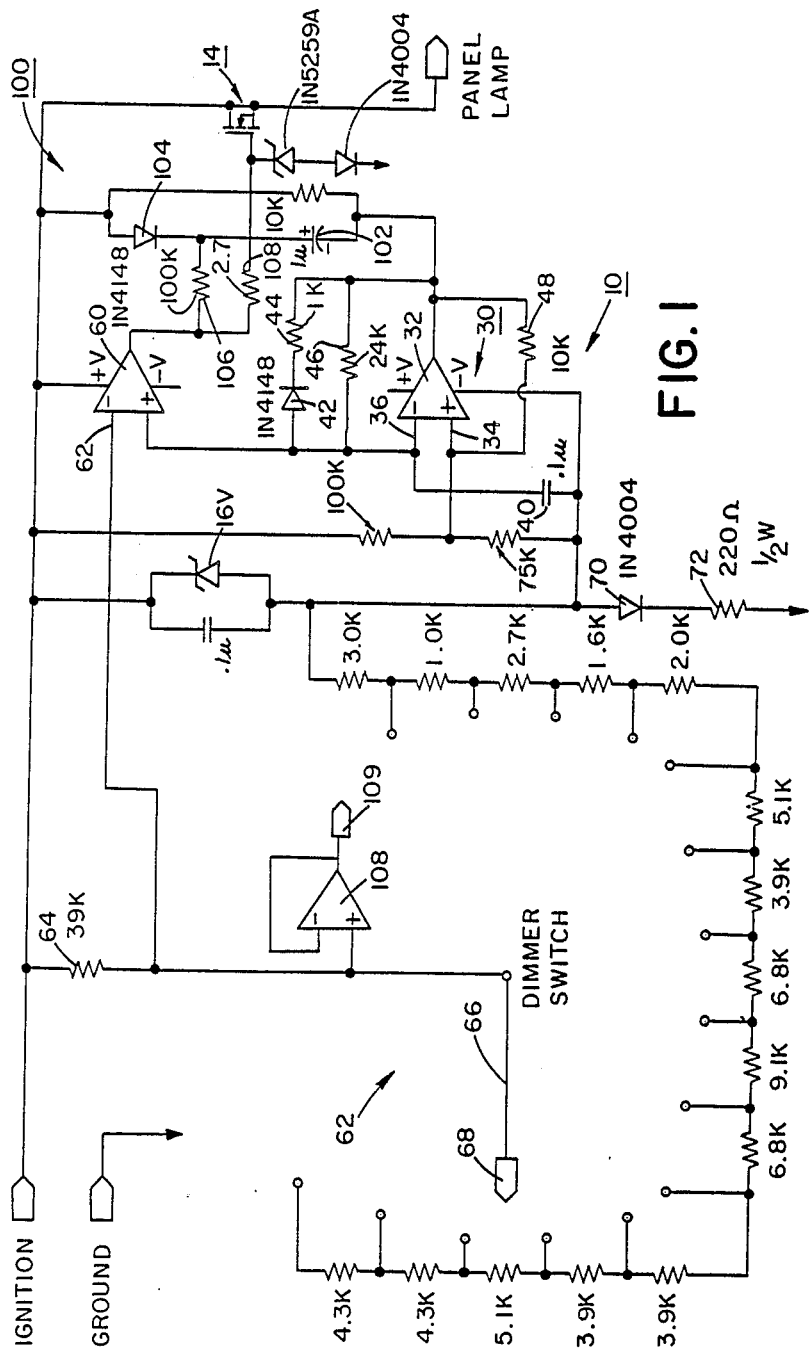
FIG. 1 is a circuit schematic for the invention.

Turning now to the drawings, FIG. 1 is a schematic of a control circuit 10 used to modulate the power output used to energize a control device. The disclosed embodiment is particularly suited for attenuating drive signals applied across a dashboard panel lamp cluster to allow the motor vehicle operator to adjust the lamp illumination.

Figure 3:
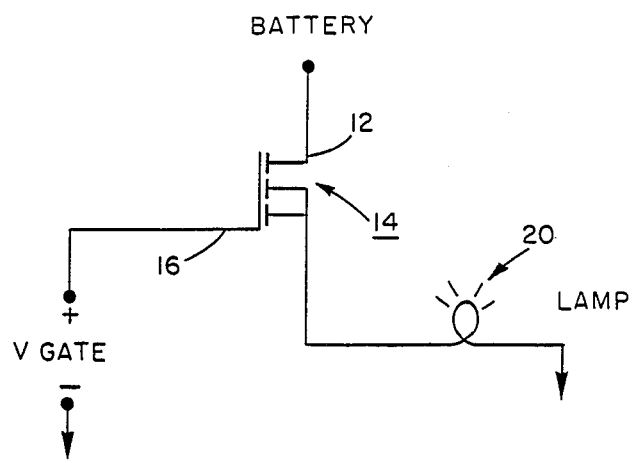
FIG. 3 is an enlarged circuit schematic showing an FET drive transistor for driving a panel lamp.
Figure 4:
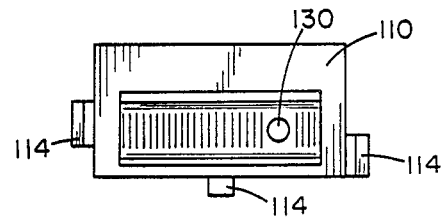
FIG. 4 is a front elevation view of a panel lamp control knob for adjusting average power that energizes the panel lamp.
Figure 5:
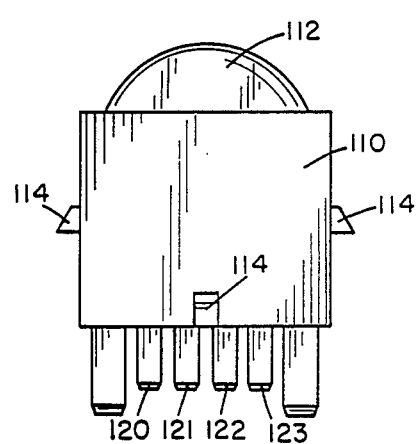
FIG. 5 is a plan view of the FIG. 4 control module.
Figure 7:
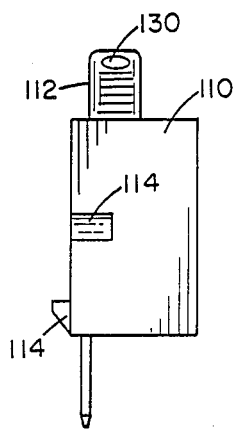
Figure 6:
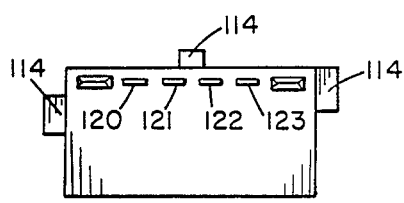
FIG. 6 is a rear elevation view of the control module showing contact pins for interfacing the control module; and, FIG. 7 is a side elevation view of the control module.

As seen most clearly in FIG. 3, a battery signal of 12 volts is coupled to the circuit 10 of FIG. 1 and is applied to the drain input 12 of a field effect transistor 14. A control input to the gate 16 of the transistor 14 dictates whether current flows through the transistor. When the transistor conducts, a lamp 20 shown in FIG. 3 is energized since the 12 volt (approx.) signal from the battery is coupled across the lamp.

The control technique utilized in conjunction with the FIG. 3 circuit is a pulse width modulated control. If the gate voltage to the FET is modulated with a duty cycle which can be controlled by the motor vehicle operator, the lamp illumination intensity can be controlled. The particular configuration shown in FIG. 3 is useful since during those periods of a pulse width modulated signal that the transistor conducts, a very low impedance is coupled in series with the dashboard lamp 20. To accomplish this low impedance driving of the lamp, the FET drain is directly coupled to the source of energizing voltage and no intervening impedance devices such as resistors or the like are needed. This construction results in one requirement, however, in that to activate the transistor 14, the gate voltage must be a specified amount above the battery input at the transistor's drain. In particular, to guarantee turning on of the transistor, a 6 volt difference between the gate and drain input is needed.

Returning to FIG. 1, an oscillator circuit 30 comprises a comparator amplifier 32 having non-inverting and inverting inputs 34, 36. The inverting input to the comparator amplifier 32 is coupled to a capacitor 40 that is charged to a maximum voltage when the comparator output goes high and is discharged through a diode 42 when the comparator output goes low. The relative time periods for charging and discharging the capacitor are substantially different. During the discharge period, the capacitor 40 is coupled to the comparator output through the diode 42 and a small resistor 44. During the charging period, the capacitor 40 charges through a relatively large resistor 46 so that the voltage on the capacitor is a saw-tooth waveform having a relatively gentle upward ramping slope and a relatively rapid decreasing slope on the discharge portion of the cycle. A feedback resistor 48 adds a degree of hysteresis to the oscillator operation to assure the comparator output oscillates and does not reach a steady state condition.

The voltage on the capacitor 40 is coupled to a non-inverting input on a second comparator amplifier 60 used as a threshold sensing comparator. The inverting input 62 to the comparator 60 is coupled to a voltage divider network 62, having a fixed leg resistor 64 coupled to the voltage source which drives the lamp, and a variable resistance portion that comprises a tapped resistance network formed from a plurality of discrete resistor components. A rotary switch 66 having an adjustable contact 68 is positioned by a user such that the contact 68 completes a path to ground from the tapped resistor network through a diode 70 and resistor 72. Depending upon the rotary switch setting, a resultant reference potential at the input 62 to the comparator 60 can be raised and lowered and thereby define a pulse width modulated duty cycle output from the comparator 60. In operation, the comparator 60 compares the reference signal at the input 62 with the voltage on the capacitor 40 and generates an output dependent upon the relative size between these two signals.

Figure 2:
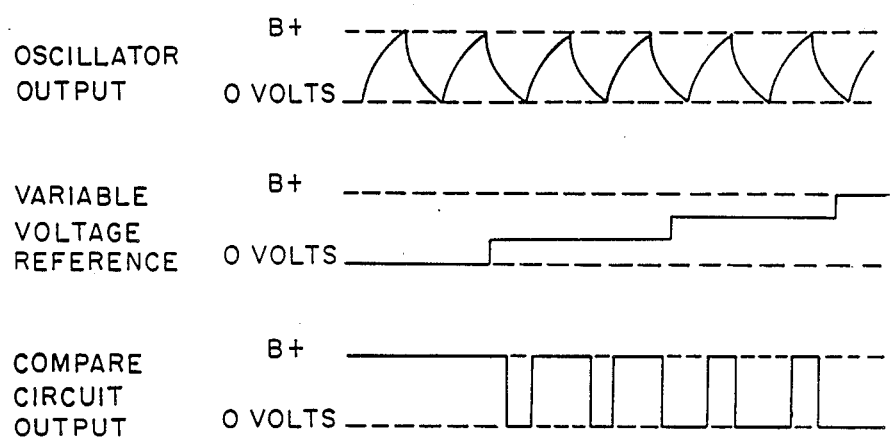
FIG. 2 depicts waveforms at various circuit junctions in the FIG. 1 schematic.

Turning to FIG. 2, the output from the comparator is schematically depicted for different reference voltage settings as dictated by the user controllable rotary switch 66. As seen in FIG. 2 the oscillating voltage signal at the non-inverting comparator input is unchanged but as the reference potential is adjusted from a value close to ground to a value approximating the battery voltage, the pulse width modulated duty cycle of the comparator 60 changes from approximately 100% to 0%. As the output duty cycle is reduced, the lamp illumination is also reduced so that for a maximum illumination, the reference voltage applied at the input 62 should be a minimum.

A doubler circuit 100 includes a capacitor 102, diode 104 and coupling resistors 106, 108. When the output from the comparator 60 is low, the gate input is less than the drain input to the transistor and therefore the transistor does not conduct. To bias the transistor 14 into conduction, it is necessary that the gate input be biased at a level greater than the drain and therefore the necessity for the doubler circuit 100. The mechanism for providing this high level signal is provided by the output from the oscillator comparator 32. When this output is low, the capacitor 102 of the doubler circuit 100 charges through the diode 104 to a voltage of approximately 12 volts. It is recalled that when the output from the comparator 32 goes low, the capacitor 40 discharges through the resistor 44. This occurs rapidly but not so rapidly that the capacitor 102 in the doubler circuit cannot be fully charged. When the output from the comparator 32 goes high, the capacitor voltage at the non-inverting comparator input begins to ramp upward and it is during this phase of the oscillator signal that the comparator 60 compares the reference signal with the capacitor signal. For those periods the reference signal is less than the capacitor voltage, the output from the comparator 60 is high. This high signal is increased by the amount of voltage carried by the capacitor 102 since the positive terminal of the capacitor 102 is coupled to the comparator output through the resistor 106. The negative side of the capacitor 102 is coupled to the battery voltage at the ignition input to the circuit and therefore when the comparator 60 generates a high output, the gate input to the transistor 14 is a voltage greater than the comparator output and specifically is a value of approximately 18 volts, a value sufficient to turn on the transistor 14. When the comparator output goes low, the transistor 14 turns off and awaits the next cycle from the oscillating voltage at the capacitor 40.

An amplifier 108 (FIG. 1) has an input 108a coupled to a junction between the resistor 64 and the dimmer switch 66. An amplifier output 109 provides an analog signal for use in those instances an existing circuit requires a controlled d.c. voltage. In the disclosed circuit the dimmer switch 66 that controls the pulse width modulated output to the panel lamp also adjusts the voltage at the analog output 109 since the voltage at the amplifier input 108a varies with the setting of the dimmer switch 66.

Turning to FIGS. 4–7, the rotary switch 66 is housed in a module or housing 110 having an actuator 112 in the form of a control knob which can be actuated by the user and in particular rotated through an angle of approximately 90° to increase and decrease the reference input to the comparator 60 (FIG. 1). The module 110 is preferably a panel-mounted module having panel retaining clips 114 which retain the module in place on a vehicle dashboard. Four signal carrying electric contacts 120–123 are coupled to the FIG. 1 circuit through the module 110. The output on one contact 123 is a pulse width modulated signal which when coupled to a panel lamp attenuates panel illumination in a manner described previously. By rotating the actuator 112 the duty cycle of this pulse width signal is controlled. As seen most clearly in FIG. 4, the actuator 112 has a serrated edge to facilitate user rotation of the actuator. In addition, an indicator dot 130 on the outer periphery of the actuator enables the user to have a general indication on what level the panel light is now set.

The contacts 120–122 carry individual ignition and ground signals as well as the analog output from the amplifier 108. Note, however, that if the particular use of the circuit does not require adjustable analog output the amplifier output is open.

The present invention has been described in conjunction with a panel lamp and in particular a mechanism for adjusting the illumination provided by such a lamp. The disclosed circuit and techniques, however, have applicability in any circumstance wherein controlled attenuation of a signal in a manner analogous to prior art rheostat control is desirable. Thus, it is the intent that the invention include all modifications and alterations from the disclosed preferred embodiment falling within the spirit or scope of the appended claims.

I claim:

1. A power control circuit for regulating energizing power coupled to a device in a motor vehicle comprising:
   (a) a d.c. voltage source for energizing the device;
   (b) oscillator means for generating an oscillating voltage waveform that varies between a maximum and a minimum voltage;
   (c) comparator means for comparing the oscillating voltage waveform from the oscillator means with a reference voltage to produce a pulse width modulated output whose duty cycle varies as a function of the reference voltage; and
   (d) drive means coupled to the pulse width modulated output of the comparator means for coupling the device to the d.c. voltage source in synchronism with the pulse width modulated output;
   (e) said comparator means including a reference voltage divider circuit connected to the d.c. voltage source including adjustment means to allow a user to adjust the reference voltage and control the average voltage applied to the device by the drive means.

2. The power control circuit of claim 1 wherein the d.c. voltage source comprises a motor vehicle battery and the drive means comprises a field effect transistor having a drain coupled to the battery and a source coupled to the device and wherein the output of the comparator means is coupled to the gate of said field effect transistor to bias said transistor into conduction in synchronism with said pulse width modulated output.

3. A method of controlling power delivered to a motor vehicle device by pulse width modulating a direct current energizing signal that is coupled to the device, said method comprising the steps of:
   (a) providing an oscillating signal that repeatedly varies from a maximum to a minimum value;
   (b) comparing the repeatedly varying oscillating signal with a reference signal and generating a pulse width modulated output signal whose duty cycle depends on how long the oscillating signal is less than the reference signal;
   (c) adjusting the reference signal to control the duty cycle of the pulse width modulated output signal; and
   (d) coupling the direct current energizing signal to the device in synchronism with the pulse width modulated output signal.

4. The method of claim 3 wherein the adjusting step is performed by providing a voltage divider network having a plurality of taps, each tap having a different voltage output, energizing said tapped voltage divider network with the direct current energizing signal and coupling a selected one tap from the voltage divider network to a comparator circuit as said reference signal for comparing with the oscillating signal during said comparing step.

5. An electronic rheostat comprising:
   (a) a modulating circuit for generating a pulse width modulated output; said modulating circuit including:
      (i) a comparator;
      (ii) an oscillator having an output coupled to one comparator input; and
      (iii) an adjustable voltage divider for coupling an adjustable reference signal to a second input of said comparator;
      (iv) said comparator producing a pulse width modulated output with a duty cycle controlled by the reference signal;
   (b) a switching element electrically connected to the comparator output and responsive to the pulse width modulated output of said comparator to selectively couple an energizing signal through the electronic rheostat to a rheostat output at the duty cycle of said comparator output;
   (c) a rheostat housing defining an enclosure for housing the modulating circuit and the switching means and including mounting tabs for mounting said rheostat housing to a panel;
   (d) a rheostat actuator movably mounted to said rheostat housing for adjusting the setting of the adjustable voltage divider and thereby control the duty cycle of said comparator output; and
   (e) three electric contacts supported by said housing, one contact for routing a reference or ground signal into said housing to said modulating circuit, a second contact for routing the energizing signal into the housing, and the third contact for routing a modulating output from said rheostat from the housing.

6. The rheostat of claim 5 additionally comprising an analog amplifier coupled to said voltage divider and a fourth electric contact coupled to an output of the analog amplifier.

7. A power control circuit for regulating energizing power coupled to a device, said control circuit comprising:
   (a) a d.c. voltage source for energizing the device;
   (b) oscillator means for generating an oscillating voltage waveform that varies between a maximum and a minimum voltage;
   (c) comparator means for comparing the oscillating voltage waveform from the oscillator means with a reference voltage to produce a pulse width modulated output whose duty cycle varies as a function of the reference voltage;
   (d) drive means coupled to the pulse width modulated output of the comparator means for energizing the device in synchronism with the pulse width modulated output by coupling the d.c. voltage source to said device;
   (e) said comparator means including a reference voltage divider circuit connected to the d.c. voltage source including adjustment means to allow a user to adjust the reference voltage and control the average voltage applied to the component by the drive means; and
   (f) an analog output amplifier coupled to the voltage divider circuit to provide an analog output in addition to the output from the drive means.

8. A power control circuit for regulating energizing power coupled to a component, said control circuit comprising:
   (a) a d.c. voltage source for energizing the device;
   (b) oscillator means for generating an oscillating voltage waveform that varies between a maximum and a minimum voltage;
   (c) comparator means for comparing the oscillating voltage waveform from the oscillator means with a reference voltage to produce a pulse width modulated output whose duty cycle varies as a function of the reference voltage; and (d) drive means coupled to the pulse width modulated output of the comparator means for energizing the device in synchronism with the pulse width modulated output by coupling the d.c. voltage source to said device;

(e) said comparator means including a reference voltage divider circuit connected to the d.c. voltage source including adjustment means to allow a user to adjust the reference voltage and control the average voltage applied to the device by the drive means; and (f) said drive means including
  (i) a field effect transistor having a drain coupled to the d.c. voltage source and a source coupled to the device and wherein the output of the comparator means is coupled to the gate of said field effect transistor to bias said transistor into conduction in synchronism with said pulse width modulated output; and
  (ii) a voltage doubler coupled to an output from the comparator means to assure a sufficient bias voltage is coupled to the gate of said field effect transistor to bias the transistor into conduction.

9. A module for detachably mounting to a display panel and controlling a device of a motor vehicle:

(a) a monitoring circuit including ignition and ground inputs and powered by a voltage difference between said inputs, said monitoring circuit having an interface for generating an output signal in response to a sensed condition that varies during the operation of the motor vehicle;

(b) a driving circuit coupled to the output signal for driving such device; and (c) a support for mounting the monitoring circuit to the panel so that a portion of the module is accessible to an information conveying side of said display panel.

10. A module according to claim 9 wherein the module includes a rotatable actuator and an energization signal receiving contact for receiving a d.c. energization circuit and wherein the interface comprises:

(i) an oscillator for generating an oscillating voltage waveform that varies between a maximum and a minimum voltage; and (ii) a reference voltage divider circuit connected to the energization signal for generating a reference voltage signal related to an angular displacement of the rotatable actuator; and (iii) a comparator for receiving the oscillating voltage waveform and the reference voltage signal and comparing the oscillating voltage waveform and reference voltage signal to produce the output signal.

11. A module according to claim 10 wherein the driving circuit includes:

(i) a field effect transistor having a drain coupled to the energization signal receiving contact and a source coupled to the device and wherein the output of the comparator is coupled to the gate of said field effect transistor to bias said transistor into conduction in synchronism with said pulse width modulated output; and (ii) a voltage doubler coupled to an output from the comparator means to assure a sufficient bias voltage is coupled to the gate of said field effect transistor to bias the transistor into conduction.

12. A module according to claim 9 wherein the housing includes a plurality of protrusions for retaining the module in place on the display panel, and wherein the module includes a contact extending through said housing for engagement with another electrical device on such motor vehicle.

13. A module according to claim 9 wherein the device comprises illuminating means for generating light when driven by the driving circuit.

14. A module according to claim 9 wherein the monitoring circuit is mounted on a circuit board and wherein the combination of the circuit board and the monitoring circuit is at least partially enclosed by a housing that engages the display panel.

15. A module according to claim 9 wherein the reference voltage source includes:

(i) a tapped resistance network comprising a plurality of resistors connected in series terminating in an end;

(ii) an actuator rotatably mounted near the resistance network;

(iii) an adjustable contact mounted for rotation with the actuator for selectively tapping said resistance network so as to provide a discretely variable resistance between the adjustable contact and the end of the resistance network.

* * * * *